US012299568B2

United States Patent
Li et al.

(10) Patent No.: US 12,299,568 B2
(45) Date of Patent: May 13, 2025

(54) CONVOLUTION NEURAL NETWORK BASED LANDMARK TRACKER

(71) Applicant: L'Oreal, Paris (FR)

(72) Inventors: Tian Xing Li, Toronto (CA); Zhi Yu, Toronto (CA); Irina Kezele, Toronto (CA); Edmund Phung, Toronto (CA); Parham Aarabi, Richmond Hill (CA)

(73) Assignee: L'Oreal, Paris (FR)

( * ) Notice: Subject to any disclaimer, the term of this patent is extended or adjusted under 35 U.S.C. 154(b) by 392 days.

(21) Appl. No.: 17/528,294

(22) Filed: Nov. 17, 2021

(65) Prior Publication Data

US 2022/0075988 A1    Mar. 10, 2022

Related U.S. Application Data

(62) Division of application No. 16/854,993, filed on Apr. 22, 2020, now Pat. No. 11,227,145.

(Continued)

(51) Int. Cl.
*G06T 7/00* (2017.01)
*G06N 3/047* (2023.01)
(Continued)

(52) U.S. Cl.
CPC ............... *G06N 3/08* (2013.01); *G06N 3/047* (2023.01); *G06N 3/082* (2013.01); *G06T 5/20* (2013.01);
(Continued)

(58) Field of Classification Search
CPC .... G06V 10/82; G06V 10/764; G06V 10/454; G06V 10/771; G06V 30/19173;
(Continued)

(56) References Cited

U.S. PATENT DOCUMENTS

2017/0147905 A1    5/2017  Huang
2017/0154420 A1    6/2017  Barnes
(Continued)

FOREIGN PATENT DOCUMENTS

CN          108986127 A    12/2018
JP          2020-526809 A    8/2020
WO      WO 2019/014646 A1    1/2019

OTHER PUBLICATIONS

Sandler, M., Howard, A., Zhu, M., Zhmoginov, A., & Chen, L. C. (2018). Mobilenetv2: Inverted residuals and linear bottlenecks. In Proceedings of the IEEE conference on computer vision and pattern recognition (pp. 4510-4520). (Year: 2018).*

(Continued)

*Primary Examiner* — Li Liu
(74) *Attorney, Agent, or Firm* — Oblon, McClelland, Maier & Neustadt, L.L.P.

(57) ABSTRACT

There are provided systems and methods for facial landmark detection using a convolutional neural network (CNN). The CNN comprises a first stage and a second stage where the first stage produces initial heat maps for the landmarks and initial respective locations for the landmarks. The second stage processes the heat maps and performs Region of Interest-based pooling while preserving feature alignment to produce cropped features. Finally, the second stage predicts from the cropped features a respective refinement location offset to each respective initial location. Combining each respective initial location with its respective refinement location offset provides a respective final coordinate (x,y) for each respective landmark in the image. Two-stage localization design helps to achieve fine-level alignment while remaining computationally efficient. The resulting architecture is both small enough in size and inference time to be (Continued)

suitable for real-time web applications such as product simulation and virtual reality.

20 Claims, 4 Drawing Sheets

Related U.S. Application Data (60) Provisional application No. 62/837,386, filed on Apr. 23, 2019.

(51) Int. Cl.
| | |
|---|---|
| *G06N 3/08* | (2023.01) |
| *G06N 3/082* | (2023.01) |
| *G06T 5/20* | (2006.01) |
| *G06T 7/11* | (2017.01) |
| *G06T 7/143* | (2017.01) |
| *G06T 19/00* | (2011.01) |
| *G06V 10/764* | (2022.01) |
| *G06V 10/771* | (2022.01) |
| *G06V 10/82* | (2022.01) |
| *G06V 40/16* | (2022.01) |

(52) U.S. Cl.
CPC ............... *G06T 7/11* (2017.01); *G06T 7/143* (2017.01); *G06T 19/006* (2013.01); *G06V 10/764* (2022.01); *G06V 10/771* (2022.01); *G06V 10/82* (2022.01); *G06V 40/162* (2022.01); *G06V 40/171* (2022.01); *G06T 2207/20081* (2013.01); *G06T 2207/20084* (2013.01)

(58) Field of Classification Search
CPC ...... G06V 30/194; G06V 40/171; G06T 7/11; G06T 2207/20081; G06T 2207/20084; G06T 19/006; G06N 3/0454; G06N 3/08; G06K 9/6228; G06K 9/6269
See application file for complete search history.

(56) References Cited

U.S. PATENT DOCUMENTS

| | | | |
|---|---|---|---|
| 2018/0061046 A1 | 3/2018 | Bozorgtabar | |
| 2018/0137642 A1* | 5/2018 | Malisiewicz | ........ G06N 3/0445 |
| 2018/0165548 A1 | 6/2018 | Wang | |
| 2018/0260951 A1* | 9/2018 | Yang | ................ A61B 6/5217 |
| 2018/0322632 A1 | 11/2018 | Barnes | |
| 2020/0311402 A1* | 10/2020 | Zhang | ................ G06N 3/0445 |
| 2021/0056701 A1 | 2/2021 | Vranceanu et al. | |
| 2021/0142479 A1 | 5/2021 | Phogat | |
| 2021/0264599 A1* | 8/2021 | Gong | .................... G06V 10/25 |

OTHER PUBLICATIONS

Yuen, Kevan, and Mohan M. Trivedi. "An occluded stacked hourglass approach to facial landmark localization and occlusion estimation." IEEE Transactions on Intelligent Vehicles 2.4 (2017): 321-331. (Year: 2017).*
Bulat, A., & Tzimiropoulos, G. (Oct. 2016). Human pose estimation via convolutional part heatmap regression. In European Conference on Computer Vision (pp. 717-732). Springer, Cham. (Year: 2016).*
Xiao, S., Feng, J., Liu, L., Nie, X., Wang, W., Yan, S., & Kassim, A. (2017). Recurrent 3d-2d dual learning for large-pose facial landmark detection. In Proceedings of the IEEE International Conference on Computer Vision (pp. 1633-1642). (Year: 2017).*
Zhang, Junfeng, Haifeng Hu, and Shenming Feng. "Robust facial landmark detection via heatmap-offset regression." IEEE Transactions on Image Processing 29 (2020): 5050-5064.*
Zhang, Zhanpeng, et al. "Facial landmark detection by deep multi-task learning." Computer Vision-ECCV 2014: 13th European Conference, Zurich, Switzerland, Sep. 6-12, 2014, Proceedings, Part VI 13. Springer International Publishing, 2014.*
Guo X, Li S, Yu J, Zhang J, Ma J, Ma L, Liu W, Ling H. PFLD: A practical facial landmark detector. arXiv preprint arXiv: 1902. 10859. Feb. 28, 2019.
Zhang N, Shelhamer E, Gao Y, Darrell T. Fine-grained pose prediction, normalization, and recognition. arXiv preprint arXiv: 1511.07063. Nov. 22, 2015.
Xiao, Shengtao, et al. "Recurrent 3d-2d dual learning for large-pose facial landmark detection." Proceedings of the IEEE International Conference on Computer Vision. 2017.
Merget, Daniel, Matthias Rock, and Gerhard Rigoll. "Robust facial landmark detection via a fully-convolutional local-global context network." Proceedings of the IEEE conference on computer vision and pattern recognition. 2018.
Chinese Office Action dated May 16, 2024, issued in Chinese Patent Application No. 202060036625.2 (with English translation).
Adrian Bulot, Georgios Tzimiropoulos. "Two-stage Convolutional Part Heatmap Regression for the 1st 3D Pace Alignment in the Wild (3DFAW) Challenge." Computer Vision Laboratory, University of Nottingham, Nottingham, UK, arXiv:1609.09545v1 [cs.CV] Sep. 29, 2016.
Kaiming He et al. "Mask R-CNN," Facebook AI Research (FAIR). arXiv:1703.06870v3 [cs.CV] Jan. 24, 2018.
Chinese Office Action dated Oct. 30, 2024, issued in Chinese Application Serial No. 202080036825.2.

* cited by examiner

CONVOLUTION NEURAL NETWORK BASED LANDMARK TRACKER

CROSS-REFERENCE

This application is a division of and claims the benefit of priority under 35 U.S.C. § 120 from U.S. application Ser. No. 16/854,993 filed Apr. 22, 2020, and claims the benefit of priority from U.S. Provisional Application 62/837,386 filed Apr. 23, 2019, the entire contents of each of which are incorporated herein by reference.

FIELD

This disclosure relates to improvements in computers and computer processing, particularly image processing and neural networks and more particularly to convolution neural network based landmark tracker systems and methods.

BACKGROUND

Facial landmark detection, the process of locating pre-defined landmarks on a human face in an image is a common desire in many image processing/computer vision applications. Image processing applications of interest providing practical applications may include facial recognition, animation and augmented reality uses, among others. One example of augmented reality image processing is a virtual try-on application such as for makeup or other products applied to an individual. Virtual makeup try-on applications are tasked to render makeup onto the right locations under different lighting, pose, and face shape variations. Precise alignment, especially for frontal face poses, which are commonly seen in virtual try-on applications, is desired to provide an accurate and pleasing experience. Furthermore, for client-side Web applications, load time is extremely important, and GPUs necessary for fast execution of larger neural network architectures are not as efficiently utilizable.

While these resource constraints are not a large point of concern for state-of-the-art facial alignment architectures [1][2][3] (see the References list herein below, each of which is incorporated herein by reference), to strike a better balance for real-time applications, it is desired that an ideal architecture minimizes load and execution time while preserving or improving alignment accuracy.

SUMMARY

In the proposed architecture, a first stage makes initial predictions, from which crops of shared convolutional features are taken; these regions of interest are then processed by a second stage to produce refined predictions. This two-stage localization design helps to achieve fine-level alignment while remaining computationally efficient. The resulting architecture is both small enough in size and inference time to be suitable for real-time web applications.

In one aspect there is provided a computing device comprising a processing unit and a storage device coupled thereto, the storage unit storing instructions that when executed by the processing unit configure the computing device to process an image to determine respective locations of each of a plurality of landmarks by: processing the image using a Convolutional Neural Network (CNN) having a first stage and a second stage, wherein: the first stage processes the image to generate initial predictions of the respective locations; and the second stage, using intermediate features generated from the image by the first stage, and the initial predictions, generates crops of shared convolutional features for regions of interest to define cropped features and further processes the cropped features to produce respective refinement location offsets to the initial predictions of the respective locations.

In one aspect there is provided a computing device comprising a processing unit and a storage device coupled thereto, the storage unit storing instructions that when executed by the processing unit configure the computing device to process an image to determine respective locations of each of a plurality of landmarks by: processing the image using a Convolutional Neural Network (CNN) having a first stage and a second stage, wherein: the first stage receives the image and determines: in a first portion of the first stage, a volume of intermediate features from the image; and, in a second portion of the first stage using the volume of intermediate features, a respective initial location for each of the landmarks within the image; and the second stage receives, at a first portion of the second stage, the volume of intermediate features and receives, at a second portion of the second stage, the respective initial location for each of the landmarks, the second stage further: processing the volume to further refine the intermediate features; performing, on the intermediate features as further refined, a Region of Interest-based pooling while preserving feature alignment to produce cropped features for each of the plurality of landmarks; and, determining, using the cropped features and for each landmark, respective refinement location offsets for each respective initial location of each landmark; and wherein the processing further operating to combine each respective initial location and the respective refinement location offset to determine final location coordinates in the image of each of the plurality of landmarks.

In one aspect there is provided a computing device comprising a processor and a storage device, the computing device configured via a Convolutional Neural Network (CNN) to process an image to detect respective locations of a plurality of landmarks in the image, the CNN comprising: a two stage localization architecture in which a first stage employs first heat maps to determine initial coordinates for the respective locations and a second stage employs second heat maps to determine refinement offsets for the initial coordinates, the second stage further using region of interest pooling for each individual landmark for reducing overlapping computation to avoid non-relevant regions and to guide the production of relevant shared features; and wherein the CNN is trained with auxiliary coordinate regression loss to minimize a size and computational resource use of the respective heat maps.

Method, computer program product and other aspects will be apparent to those of ordinary skill in the art. A computer program product as used herein comprises a non-transitory storage device storing instructions that when executed by a processing unit configure a computing device.

The present inventive concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light. More than one inventive concept may be shown and described and each may stand-alone or be combined with one or more others unless stated otherwise.

DETAILED DESCRIPTION

1. Context

1.1 Facial Landmark Alignment

The facial landmark alignment problem has a long history with classical computer vision solutions. For instance, the fast ensemble tree based [4] algorithm achieves reasonable accuracy and is widely used for real-time face tracking[5]. However, the model size required to achieve such accuracy is prohibitively large.

Current state-of-the-art accuracy for facial landmark alignment is achieved by convolutional neural network based methods. To maximize accuracy on extremely challenging datasets [6][7][8], large neural networks are used that are not real-time, and have model sizes of tens to hundreds of megabytes (MB) [3][9] and that entail unreasonable load times for Web applications.

1.2 Efficient CNN Architectures

To bring the performance of convolutional neural networks to mobile vision applications, numerous architectures with efficient building blocks such as MobileNetV2[10], SqueezeNet[11] and ShuffleNet[12] have recently been released. These networks aim to maximize performance (e.g. classification accuracy) for a given computational budget, which consists of the number of required learnable parameters (the model size) and multiply-adds.

A focus is given to MobileNetV2, whose inverted residual blocks may be used in an implementation of the present design. MobileNetV2's use of depthwise convolution over regular convolutions drastically reduces the number of multiply-adds and learnable parameters, at a slight cost in performance[13]. Furthermore, the inverted design, which is based upon the principle that network expressiveness can be separated from capacity, allows for a large reduction in the number of cross-channel computations within the network [10]. Finally, the residual design taken from ResNet[14] eases issues with gradient propagation in deeper networks.

1.3 Heat Map

Fully convolutional neural network architectures based on heat map regression [15][16][17][18] have been widely used on human pose estimation tasks. The use of heat maps provides a high degree of accuracy, along with an intuitive means of seeing the network's understanding and confidence of landmark regression. This technique has also been used in recent facial alignment algorithms such as the Stacked Hourglass architecture [3]. However, the Stacked Hourglass approach[3] uses high resolution heat maps, which require a large amount of computation in the decoding layers. There is room for optimization here, as the heat maps only have non-negligible values in a very concentrated and small portion of the overall image. This observation motivates us to use regional processing, which allows for the network to focus its processing on relevant areas (i.e. the approximate region of interest).

1.4 Mask-RCNN

There are a series of frameworks which are flexible and robust for object detection and semantic segmentation like Fast R-CNN[19], Faster R-CNN[20] and Fully Constitutional Network[21]. Faster R-CNN uses a multi-branch design to perform bounding box regression and classification in parallel. Mask-RCNN[22] is an extension of Faster-RCNN, and adds a new branch for predicting segmentation masks based on each Region of Interest. Of particular interest is Mask-RCNN's use of RoIAlign[22], (where RoI in an initialism from the term "Region of Interest") which allows for significant savings in computation time by taking crops from shared convolutional features. By doing this, it avoids re-computing features for overlapping regions of interest.

1.5 Verification

In order to keep the output facial shape to be valid, a verification step may be performed before returning a final prediction, for example, to prevent a return of a weird shape when there is no face, part of face or face is over rotated. To have a standard reference of a face shape, Principle Component Analysis may be used to get a first 100 principle clusters from the training dataset. The smallest distance between transformed predicted shape and one of a cluster centre may be determined. This smallest distance is used as a score to verify whether the predicted shape is valid.

2. Computing Devices, Systems, Methods and Other Aspects

The following are some of the features described herein:

RoIAlign[22] is used for each individual landmark to save potentially overlapping computation, allow the network to avoid non-relevant regions, and force the network to learn to produce good shared features. In an example, 8×8 heat maps from stage 1 indicate the coordinates of each of the (facial) landmarks. These landmarks may be calculated to form coordinates (x,y) by using a mask mean method. RoIAlign uses the first stage's predicted coordinates to crop an intermediate feature map with a uniform size 4×4. For example, assume there is a first landmark predicted to be located at (0.5, 0.5) in normalized coordinates. The 32×32 feature map is then cropped. The cropped box will be [(14.0, 14.0), (18.0, 18.0)] [top_left_corner, bottom_right_corner].

The proposed two-stage localization architecture along with auxiliary coordinate regression loss allows working with extremely small and computationally cheap heat maps at both stages. Two losses may be combined together—a heat map loss and a coordinates distance loss.

2.1 Model Structure.

Figure 1:
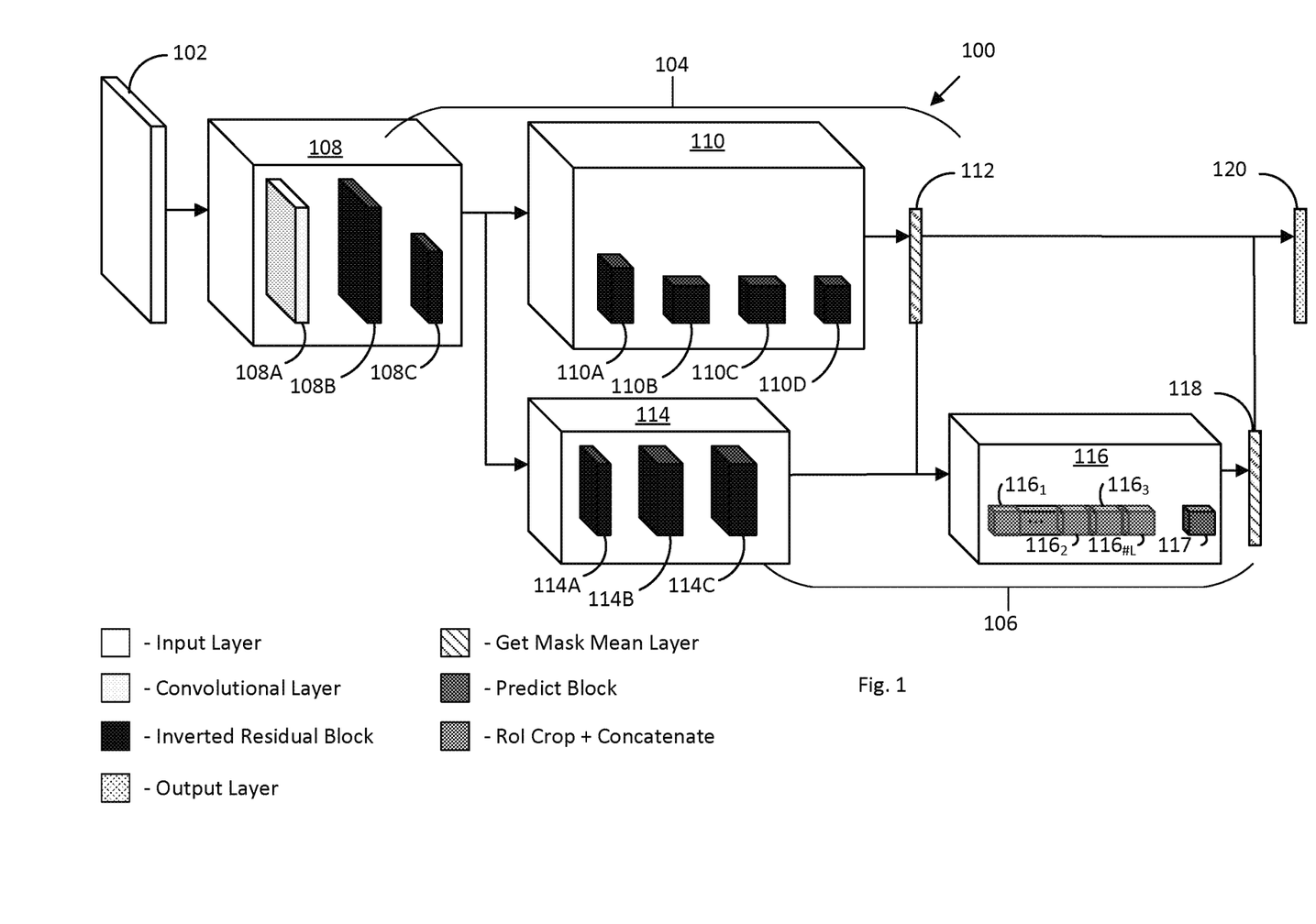
FIG. 1 is a network diagram showing a two stage CNN.

The CNN model has two-stages and is trained end-to-end, as illustrated in FIG. 1. FIG. 1 shows CNN 100 comprising flows of layers and/or blocks having output volumes (feature maps) beginning from an input layer 102 (e.g. an image with a face for a facial landmark example) of dimension 128×128×3 (height, width and color). Other dimensions may be used such as 224×224×3. The dimension may be adjustable. Different dimensions (resolution) may be used for different purposes.

The flows comprise two stages, a first stage 104 and a second stage 106. The flows of the first and second stages are defined in accordance with respective groups of layers and/or blocks comprising first stage layers/blocks and second stage layers/blocks, each having first potions and second portions. These groups of layers/blocks (e.g. 108, 110, 114 and 116) are represented by arrows between the feature maps/volumes as will be understood by persons of skill in the art. First stage 104 comprises group 108 in a first portion and group 110 in a second portion while second stage 106 comprises group 114 in a first portion and group 116 in a second portion. Groups 108 and 110 may also be referenced as first group 108 and second group 110 of the first stage. Groups 114 and 116 may also be referenced as first group 114 and second group 116 of the second stage. First stage 104 further comprises layer 112 and second stage 106 further comprises layer 118. These layers 112 and 120 are combined at layer 120 to provide the output of CNN 100 as further described.

Figure 2:
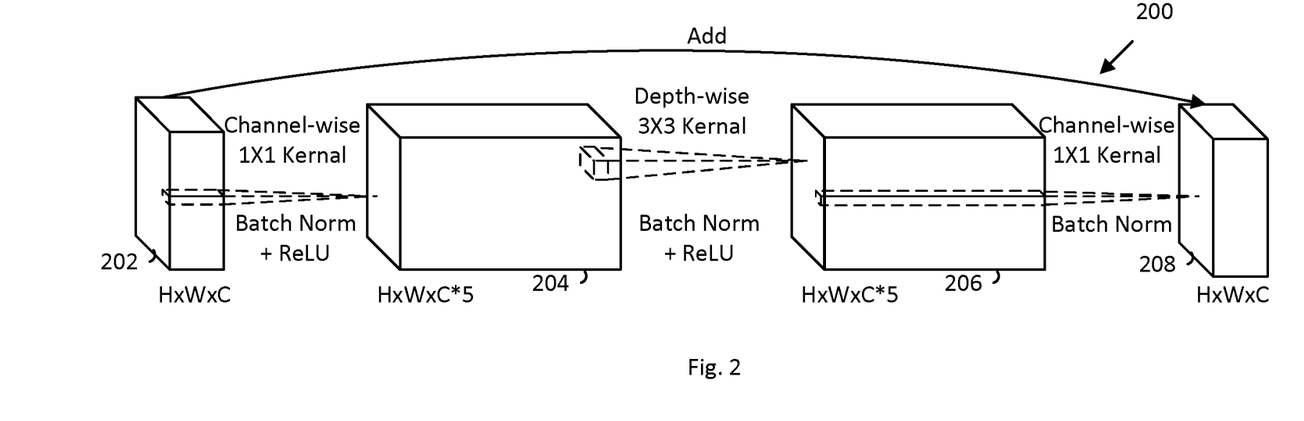
FIG. 2 is a diagram of an inverted residual block of feature maps/volumes.

The shading legend of FIG. 1 indicates a processing operation type for each of the layers and/or blocks of CNN 100. In further detail, group 108 comprises a convolutional layer 108A of dimension 64×64×8 and inverted residual blocks 108B and 108C each of dimension 64×64×8 and 32×32×8 respectively. It is understood that the dimensions for respective blocks or layers reference the size of the output feature maps. A general form of an expanded inverted residual block in accordance with is shown in FIG. 2. Group 110 comprises inverted residual blocks 110A-110D of respective dimensions 16×16×16, 8×8×32, 8×8×32 and 8×8×#L where #L=the number or count of the plurality of landmarks. As trained and tested, #L=16. Other landmark counts (sizes) (e.g. #L) may be implemented (e.g. 65, 86, etc.). The value of #L may be adjustable. Following group 110 is layer 112 a get mask mean layer of dimension #L×2.

The output of group 108 (e.g. following 118C) is an intermediate feature map (or sometimes referenced as a volume of intermediate features) of the first stage 104 is shared with (e.g. is an input to) second stage 106 at group 114. Group 114 comprises inverted residual blocks 114A-114C of respective dimensions 32×32×8, 32×32×16 and 32×32×16.

The output of group 114 (e.g. the intermediate feature map as further refined by the processing of blocks 114A-114C) along with the output of layer 112, representing initial locations of the landmarks, is processed by group 116. Group 116 comprises #L RoI Crop+concatenate blocks (represented by blocks $116_1$, $116_2$, ... $116_{\#L}$) for each of the #L landmarks where each of the #L blocks having a dimension of 4×4×16, giving 4×4×16 #L output feature maps when concatenated. The concatenated feature maps are provided to predict block 117 or group 116 having a dimension 4×4×#L. Predict block 117 is expanded in FIG. 3.

In turn, the output of predict block 117 is provided to layer 118, a second get mask mean layer of dimension #L×2. The respective outputs of the two layers 112 and 118 represent initial locations of the #L landmarks and refinement offsets thereto. These are provided to output layer 120 also having dimension #L×2 such that when combined, there is produced an (x,y) coordinate, in relation to input layer 102, for each of the respective #L landmarks.

Thus, the first stage 104 shows a series of Inverted Residual Blocks, which, by 110D predict 8 by 8 heat maps, one for each facial landmark. Interpreting the normalized activations over the heat maps as a probability distribution, the expected values of these heat maps is computed to obtain the x, y coordinates. This is described in more detail below.

The second stage has several shared layers/blocks, which branch off from part of the first stage. Using the initial predictions from the previous stage (the intermediate feature maps from group 108 following block 108C as further refined by group 114 following block 114C), RoIAlign[22] is applied to the final shared convolutional features. Each of the cropped features are input to one final convolutional layer (of a predict block 117), which has separate weights for each individual landmark. Predict block 117 makes use of group convolutions[12] to implement this in a straightforward manner. The output at 117 is a heat map for each landmark. The coordinates obtained from these heat maps indicate the required offset from the initial "coarse" prediction, i.e., if the heat map at this stage is perfectly centered, then there is effectively no refinement.

This Region of Interest based pooling by group 116 uses the first stage's prediction (from layer 112) as a crop centre with the coordinates [x_c, y_c] of each landmark which are derived from applying a mask mean layer at 112 to the coarse heat map from 110D. Group 116, (via predict block 117) uses these cropped features (e.g. the concatenated output from blocks $116_1$, $116_2$, ... $116_{\#L}$) to predict the refinement offsets (also to predict the heat map first and then using mask mean layer to get the refinement shifting distance[x_r, y_r]). The final prediction (output layer) adds up the coarse prediction from the first stage and refinement prediction from the second stage.

2.2 Coordinate Regression from Heat Maps

For the ground truth heat maps, a Gaussian distribution is used with a mode corresponding to the ground truth coordinates' positions. Letting x, y denote the coordinates of any pixel in the feature map, the value can be computed using the following distribution:

$$f(x, y) = \exp\left(-\left(\frac{(x-x_i)^2}{2\sigma_x^2} + \frac{(y-y_i)^2}{2\sigma_y^2}\right)\right) \quad (1)$$

Where $(x_i, y_i)$ is the corresponding landmark coordinate. In experiments, $\sigma_x$, $\sigma_y$ are set to both be 0.8. (e.g.

In accordance with the get mask mean layer (e.g. each of 112 and 120), the regressed $x_{pred}$, $y_{pred}$ is then the expected value of the pixel locations according to the distribution computed from the heat map predicted by the CNN (e.g. the "predicted heat map". Let j index over all the pixels in the predicted heat map, and $w_j$ denote the heat map value for that pixel:

$$\begin{bmatrix} x_{pred} \\ y_{pred} \end{bmatrix} = \sum_j w_j \begin{bmatrix} x_j \\ y_j \end{bmatrix} \quad (2)$$

2.3 Loss Function

The loss function uses a pixel-wise sigmoid cross entropy [23] to learn the heat maps.

Additionally, in order to alleviate issues with the heat maps being cut-off for landmarks near boundaries, there is added on a $L_2$ distance loss:

$$\text{loss} = \frac{1}{N}\sum_{n=1}^{N}\sum_{l=1}^{L}\sum_{i=1}^{W}\sum_{j=1}^{H}\left[p_{ij}^l \log \hat{p}_{ij}^l + (1-p_{ij}^l)\log(1-\hat{p}_{ij}^l)\right] * w_{ij}^l + \quad (3)$$

$$A\sum_{n=1}^{N}\sum_{l=1}^{L}\left(x_l^n - \hat{x}_l^n\right)^2 + \left(y_l^n - \hat{y}_l^n\right)^2$$

$$w_{ij}^l = \frac{\left((i-\hat{i}_l^n)^2 + (j^n - \hat{j}_l^n)^2\right) * 2}{W^2 + H^2} \quad (4)$$

Where $p_{ij}^l$ is the prediction value of the heat map in the lth channel at pixel location (i,j) of $n^{th}$ sample, while $p_{ij}^l$ is the corresponding ground truth. $w_{ij}^l$ is the weight at pixel location (i,j) for the location, which is calculated from equation 4. $(i_l^n, j_l^n)$ is the ground truth coordinate of the $n^{th}$'s sample's $l^{th}$ landmark, and $(x_l^n, y_l^n)$ is the predicted coordinate of the same landmark. Here L is the number of landmarks and H and W are the height and width of the heat map (e.g. 8×8). The auxiliary coordinate regression loss is the mean-square-error loss in second line of equation (3). The loss function, comprising the combined pixel-wise sigmoid cross entropy loss and the L2 loss, is applied to each respective stage such that each has its own loss determination during training. As noted, the use of two stage facilitates smaller heat maps and, thus, computing resource consumption.

2.4 Blocks
2.4.1 Inverted Residual Block

With reference to FIG. 2, there is shown a general expansion of an inverted residual block 200 substantially in accordance with reference [10]. FIG. 2 differs in that reference employs ReLU6 while the present example employs ReLU. Such a general approach may be applied to the inverted residual blocks of CNN 100, though some dimensions may differ.

Experimentally it was found that an expand ratio of 5 best suited competing needs of performance and efficiency.

The processing of Inverted Residual Block 200 performs, in order:
a. channel-wise convolutions with 1×1 kernel followed by BatchNorm and ReLU activation of an input layer 202 having dimension H×W×C, where C represents channels rather than color per se. The output is a feature map 204 of dimension H×W×C*5;
b. depth-wise convolutions with 3×3 kernel followed by BatchNorm and ReLU activation of feature map 204 providing output (feature map) 206 having dimensions H×W×C*5; and
c. channel-wise convolutions with 1×1 kernel followed by BatchNorm on feature map 206 and an add operation with layer 202 providing an output having dimensions H×W×C.

2.4.2 Predict Block

Figure 3:
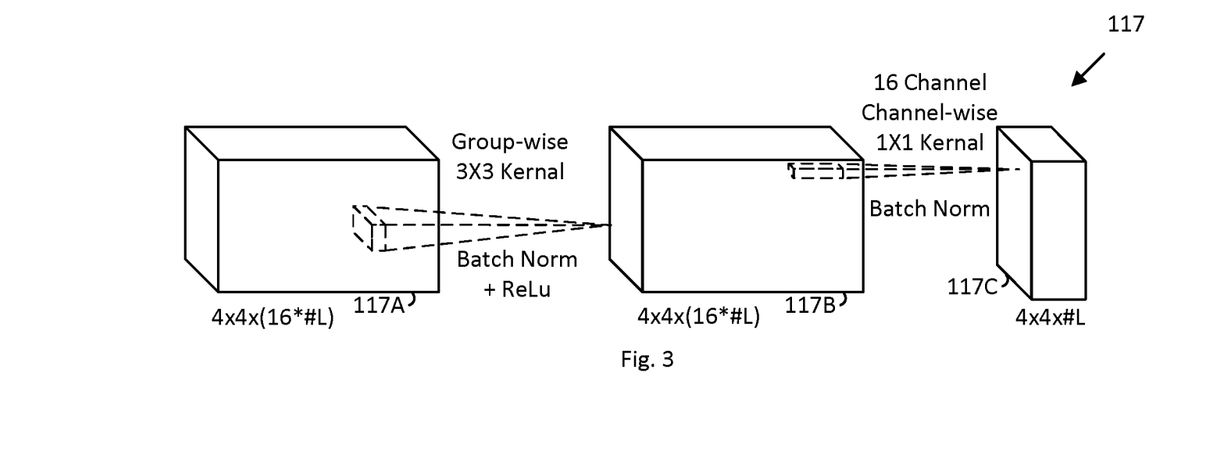
FIG. 3 is a diagram of a predict block of feature maps/volumes of a second stage of the network of FIG. 1.

After concatenating all RoIAlign cropped features, the number of channels is equal to the number of input channels (e.g. 16) multiplied by the number of landmarks (#L). Since each landmark's refinement heat map is predicted independently, such may be implemented using a 16 channel channel-wise convolution[12] as FIG. 3 shows. FIG. 3 shows an expansion of block 117 working on an input of cropped and concatenated features (input feature map 117A) having dimensions 4×4×16*#L.

Predict block 117 performs, in order:
a. group-wise convolutions with 3×3 kernel followed by BatchNorm and ReLU activation on input feature map 117A to output a feature map 117B having dimensions 4×4×16*#L; and,
b. channel-wise convolutions with 1×1 kernel followed by BatchNorm to output feature map 117C having dimensions 4×4×#L (defining 4×4 heat maps for each of the #L landmarks).

2.5 Data Augmentation

Several common methods are used to perform data augmentation. For example, random rotation, shifting, and horizontally flipping of the input image is used. To better equip the model for handling common occlusion cases such as glasses or hands, these objects are also randomly pasted in pictures around the faces therein.

3. Results and Comparison

Training of the new model used batch size 8 and a SGD optimizer with learning rate $8_e^{-5}$ and momentum=0.9. The new model was evaluated on an in-house test set, and the distance error calculated which is normalized by the distance between eye centers. The normalized error of the first stage is 3.35% and the error of the full model is 2.89%. The running time of the new model on Web browsers with an iPhone 7 is around 40 ms/frame, and its learnable parameters amount to around 300 KB in total.

Tables 1 and 2 show comparative data for the new model including a comparison to a larger in-house model RF tracker and Mobilenet_v2_0.35_128.

TABLE 1

The performance compared with in-house RF tracker.

| RF tracker | New model |
|---|---|
| Size: 4 MB data (2.9 MB with HTTP GZIP compression) Speed: ~20 ms per frame | Size: 825 KB data (318 KB with HTTP GZIP compression) Speed: ~40 ms per frame |

TABLE 2

The performance compared with MobileNetV2 [10].

| Model | Resolution | MACs (M) | Parameters (M) |
|---|---|---|---|
| Mobilenet_v2_0.35_128 | 128 | 20 | 1.66 |
| New model | 128 | 9 | 0.056 |

Figure 4:
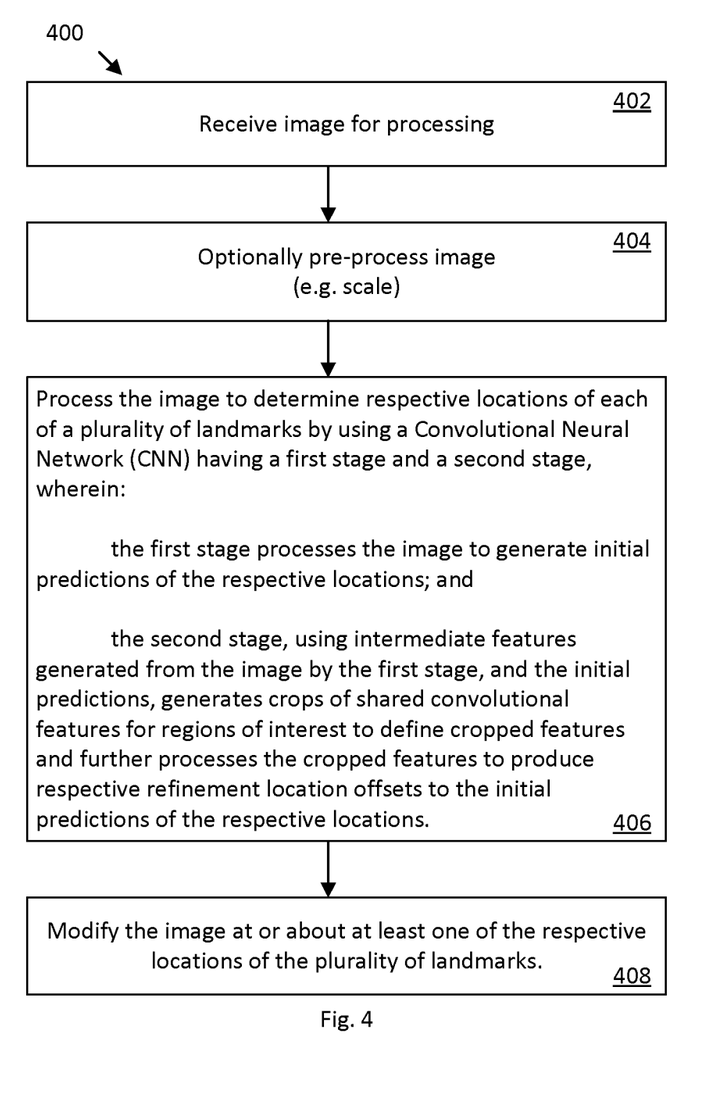
FIGS. 4 and 5 are flowcharts of operations.
Figure 5:
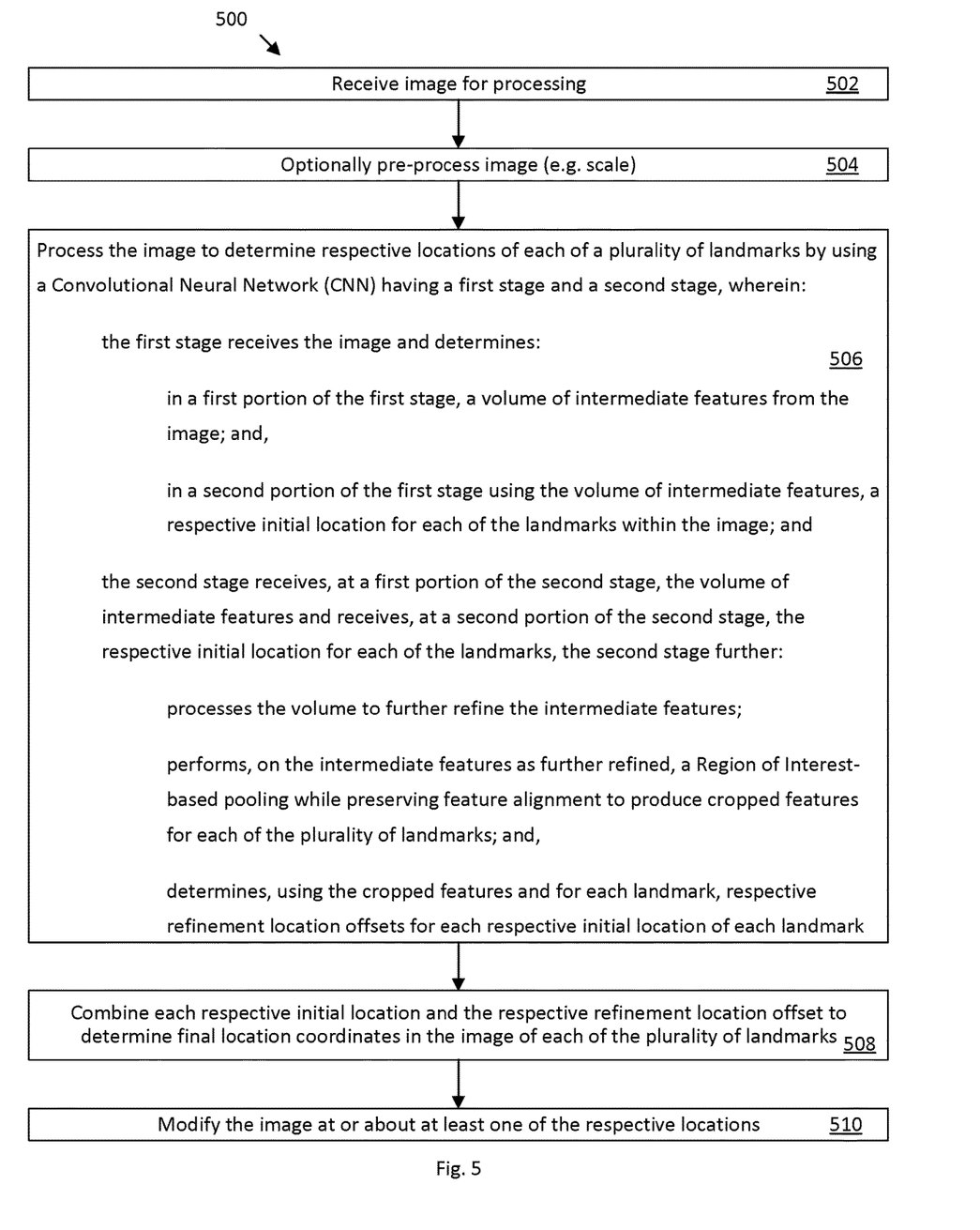

FIGS. 4 and 5 are flowcharts of operations showing computer implemented method aspects. FIG. 4 shows operations 400 of a computer implemented method. At 402, an image is received for processing. The image may be a selfie image or video based selfie image. The image may be received from a camera that is a component of the computing device or system performing the method. Such may be a mobile device, kiosk at a product counter, tablet, etc. Other form factors and computing devices and systems will be apparent. Cloud or other service based systems may be contemplated where a local computing device may receive the image via a local camera and provide the image to a remote computing device that is configured to perform as a service. The service may be provided via a native application or browser of the local computing device.

The image may be pre-processed such as by scaling to a particular dimension (step 404). At 406, operations process the image to determine respective locations of each of a plurality of landmarks by using a Convolutional Neural Network (CNN) having a first stage and a second stage. The first stage processes the image to generate initial predictions of the respective locations. The second stage, using intermediate features generated from the image by the first stage, and the initial predictions, generates crops of shared convolutional features for regions of interest to define cropped features and further processes the cropped features to produce respective refinement location offsets to the initial predictions of the respective locations.

The CNN may combine the initial predictions of the respective locations and the respective refinement location offsets to provide the respective locations for each of a plurality of landmarks. The respective locations of the landmarks may comprise final locations determined by combining the initial predictions with the respective refinement location offsets or may comprise the set of location data including the initial predictions and the respective refinement locations offsets. The location data, in any of its forms, may be provided for use, such as to modify the image at at least one of the landmark locations (step 408).

The CNN's first stage may produce and use the intermediate features to produce initial heat maps from which the initial predictions are generated.

The second stage may produce second heat maps from the cropped features, one for each landmark, and use the second heat maps to produce the respective refinement location offsets.

FIG. 5 is a flowchart showing operations 500 of a computer implemented method. The operations may be performed by a computing device or system such as described herein (e.g. in relation to FIG. 4, or otherwise). Steps 502 and 504 are similar to steps 402 and 404. Step 510 is similar to step 408, where the image is modified.

Step 506 shows processing the image to determine respective locations of each of a plurality of landmarks by using a Convolutional Neural Network (CNN) having a first stage and a second stage. The first stage receives the image and determines: in a first portion of the first stage, a volume of intermediate features from the image; and, in a second portion of the first stage using the volume of intermediate features, a respective initial location for each of the landmarks within the image. The second stage receives, at a first portion of the second stage, the volume of intermediate features and receives, at a second portion of the second stage, the respective initial location for each of the landmarks.

The second stage further operates to: process the volume to further refine the intermediate features; perform, on the intermediate features as further refined, a Region of Interest-based pooling while preserving feature alignment to produce cropped features for each of the plurality of landmarks; and, determine, using the cropped features and for each landmark, respective refinement location offsets for each respective initial location of each landmark.

The operations 500 may further operate (e.g. at 508) to combine each respective initial location and the respective refinement location offset to determine final location coordinates in the image of each of the plurality of landmarks.

In the operations 500, the second portion of the first stage may use the volume of intermediate features to determine initial heat maps and predicts each respective initial location for each of the landmarks using the initial heat maps.

In the operations of FIG. 4 or FIG. 5, at least some of the first stage may comprise a series of Inverted Residual Blocks and at least some of the second stage may comprise a series of Inverted Residual Blocks. The second stage may: use RoIAlign for Region of Interest-based pooling while preserving feature alignment to produce the cropped features; and concatenate the cropped features.

In the operations of FIG. 4 or FIG. 5, the second stage may comprises a predict block to process the cropped features, the predict block performing, in order: channel-wise convolutions with 3×3 kernel followed by BatchNorm and ReLU activation; and, group-wise channel convolutions with 1×1 kernel followed by BatchNorm; to output each of the respective refinement location offsets.

In the operations of FIG. 4 or FIG. 5, the CNN model may be trained using respective training images having ground truth heat maps for respective landmarks of the plurality of landmarks defined in accordance with Gaussian distribution with a mode corresponding to respective coordinate positions of the ground truth heat maps in the respective training images. The Gaussian distribution may be defined as previously shown herein above.

The CNN in the operations 400 or 500 may be trained with a loss function defined by pixel-wise sigmoid cross entropy for learning heat maps. The loss function may further include a $L_2$ distance loss. The loss function may be as shown and described earlier herein above.

In operations 400 or 500, modifying the image may comprise simulating a product applied to the image. The image may be a video image and the method may present the image as modified in real time to simulate a virtual reality.

In operations 400 or 500, the landmarks may be facial landmarks and the image may comprise a face. The respective operations may comprise using the respective locations of the landmarks to update the image with at least one product simulation.

In addition to computing device (or system) aspects and method aspects, a person of ordinary skill will understand that computer program product aspects are disclosed, where instructions are stored in a non-transient storage device (e.g. a memory, CD-ROM, DVD-ROM, disc, etc.) to configure a computing device to perform any of the method aspects disclosed herein.

It will be understood that the CNN may provide the respective landmark locations for further processing of the image. For example, a computing device may be configured via instructions to receive an image and perform landmark detection on the image using the CNN.

The instructions may configured the computing device to modify the image at or about at least one of the landmarks using the final coordinates for the at least one of the landmarks. The image may be annotated (an example of a modification) at or about the at least one of the landmarks, for example, showing a bounding box or region, showing a mask, etc. To modify the image may comprise simulating a product applied to the image. The product may be a makeup product such as when the image is a face and the landmarks are facial landmarks. The image may be a video image and the computing device may be configured via the instructions to modify and present the image in real time to simulate a virtual reality. The computing device may further comprise a camera and the video may be a selfie video taken by the camera.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCES

The following publications are incorporated herein by reference.
[1] M. Kowalski, J. Naruniec, and T. Trzcinski, "Deep alignment network: A convolutional neural network for robust face alignment," *CoRR*, vol. abs/1706.01789, 2017.
[2] Y. Sun, X. Wang, and X. Tang, "Deep convolutional network cascade for facial point detection," in 2013 *IEEE Conference on Computer Vision and Pattern Recognition*, pp. 3476-3483, June 2013.
[3] K. Yuen and M. M. Trivedi, "An occluded stacked hourglass approach to facial landmark localization and occlusion estimation," *CoRR*, vol. abs/1802.02137, 2018.
[4] V. Kazemi and J. Sullivan, "One millisecond face alignment with an ensemble of regression trees," 2014 *IEEE Conference on Computer Vision and Pattern Recognition*, pp. 1867-1874, 2014.
[5] D. E. King, "Dlib-ml: A machine learning toolkit," *Journal of Machine Learning Research*, vol. 10, pp. 1755-1758, 2009.
[6] P. N. Belhumeur, D. W. Jacobs, D. J. Kriegman, and N. Kumar, "Localizing parts of faces using a consensus of exemplars," *IEEE Transactions on Pattern Analysis and Machine Intelligence*, vol. 35, pp. 2930-2940, December 2013.
[7] V. Le, J. Brandt, Z. Lin, L. Bourdev, and T. S. Huang, "Interactive facial feature localization," in *Computer Vision—ECCV* 2012 (A. Fitzgibbon, S. Lazebnik, P. Perona, Y. Sato, and C. Schmid, eds.), (Berlin, Heidelberg), pp. 679-692, Springer Berlin Heidelberg, 2012.
[8] G. Trigeorgis, P. Snape, M. A. Nicolaou, E. Antonakos, and S. Zafeiriou, "Mnemonic descent method: A recurrent process applied for end-to-end face alignment," 2016 *IEEE Conference on Computer Vision and Pattern Recognition (CVPR)*, pp. 4177-4187, 2016.
[9] A. Newell, K. Yang, and J. Deng, "Stacked hourglass networks for human pose estimation," *CoRR*, vol. abs/1603.06937, 2016.
[10] M. Sandler, A. G. Howard, M. Zhu, A. Zhmoginov, and L. Chen, "MobileNetV2: Inverted residuals and linear bottlenecks: Mobile networks for classification, detection and segmentation," *CoRR*, vol. abs/1801.04381, 2018.
[11] F. N. Iandola, M. W. Moskewicz, K. Ashraf, S. Han, W. J. Dally, and K. Keutzer, "Squeezenet: Alexnet-level accuracy with 50x fewer parameters and <1 mb model size," *CoRR*, vol. abs/1602.07360, 2016.
[12] X. Zhang, X. Zhou, M. Lin, and J. Sun, "Shufflenet: An extremely efficient convolutional neural network for mobile devices," *CoRR*, vol. abs/1707.01083, 2017.
[13] A. G. Howard, M. Zhu, B. Chen, D. Kalenichenko, W. Wang, T. Weyand, M. Andreetto, and H. Adam, "Mobilenets: Efficient convolutional neural networks for mobile vision applications," *CoRR*, vol. abs/1704.04861, 2017.
[14] K. He, X. Zhang, S. Ren, and J. Sun, "Deep residual learning for image recognition," *CoRR*, vol. abs/1512.03385, 2015.
[15] A. Bulat and G. Tzimiropoulos, "Human pose estimation via convolutional part heat map regression," *CoRR*, vol. abs/1609.01743, 2016.
[16] S. Wei, V. Ramakrishna, T. Kanade, and Y. Sheikh, "Convolutional pose machines," *CoRR*, vol. abs/1602.00134, 2016.
[17] Y. Chen, C. Shen, X. Wei, L. Liu, and J. Yang, "Adversarial learning of structure-aware fully convolutional networks for landmark localization," *CoRR*, vol. abs/1711.00253, 2017.
[18] E. Insafutdinov, L. Pishchulin, B. Andres, M. Andriluka, and B. Schiele, "Deepercut: A deeper, stronger, and faster multi-person pose estimation model," *CoRR*, vol. abs/1605.03170, 2016.
[19] R. B. Girshick, "Fast R-CNN," *CoRR*, vol. abs/1504.08083, 2015.
[20] S. Ren, K. He, R. B. Girshick, and J. Sun, "Faster R-CNN: towards real-time object detection with region proposal networks," *CoRR*, vol. abs/1506.01497, 2015.
[21] J. Long, E. Shelhamer, and T. Darrell, "Fully convolutional networks for semantic segmentation," *CoRR*, vol. abs/1411.4038, 2014.
[22] K. He, G. Gkioxari, P. Dollar, and R. B. Girshick, "Mask R-CNN," *CoRR*, vol. abs/1703.06870, 2017.
[23] N. Zhang, E. Shelhamer, Y. Gao, and T. Darrell, "Fine-grained pose prediction, normalization, and recognition," *CoRR*, vol. abs/1511.07063, 2015.

What is claimed is:

1. A computing device comprising at least one processor and a storage device coupled thereto, the storage device storing instructions that when executed by the at least one processor configure the computing device to process an image to determine respective locations of each of a plurality of landmarks by:
   processing the image using a Convolutional Neural Network (CNN) having a first stage and a second stage, wherein:
   the first stage processes the image to generate intermediate features and initial predictions of the respective locations, the first stage producing initial heat maps using the intermediate features to generate the initial predictions; and
   the second stage, using the intermediate features generated from the image by the first stage, and the initial predictions, generates crops of shared convolutional features for regions of interest to define cropped features and further processes the cropped features to produce respective refinement location offsets to the initial predictions of the respective locations.

2. The computing device of claim 1 wherein the initial heat maps from which the initial predictions are generated comprise probability maps, one for each of the respective landmarks and each of the maps defining a respective probability distribution for indicating a respective one of the initial predictions.

3. The computing device of claim 1 wherein the second stage produces second heat maps from the cropped features, one for each landmark, and uses the second heat maps to produce the respective refinement location offsets.

4. The computing device of claim 1 wherein the CNN combines the initial predictions of the respective locations and the respective refinement location offsets to provide the respective locations for each of the plurality of landmarks.

5. A method comprising:
processing an image to determine respective locations of each of a plurality of landmarks by the image using a Convolutional Neural Network (CNN) having a first stage and a second stage, wherein:
the first stage processes the image to generate intermediate features, and initial predictions of the respective locations, the first stage producing initial heat maps using the intermediate features to generate the initial predictions; and
the second stage, using the intermediate features generated from the image by the first stage, and the initial predictions, generates crops of shared convolutional features for regions of interest to define cropped features and further processes the cropped features to produce respective refinement location offsets to the initial predictions of the respective locations.

6. The method of claim 5 wherein the initial heat maps from which the initial predictions are generated comprise probability maps, one for each of the respective landmarks and each of the maps defining a respective probability distribution for indicating a respective one of the initial predictions.

7. The method of claim 5 wherein the second stage produces second heat maps from the cropped features, one for each landmark, and uses the second heat maps to produce the respective refinement location offsets.

8. The method of claim 5 wherein the CNN combines the initial predictions of the respective locations and the respective refinement location offsets to provide the respective locations for each of the plurality of landmarks.

9. The method of claim 5 wherein at least some of the first stage comprises a series of Inverted Residual Blocks and wherein at least some of the second stage comprises a series of Inverted Residual Blocks.

10. A method comprising:
processing an image to determine respective locations of each of a plurality of landmarks by the image using a Convolutional Neural Network (CNN) having a first stage and a second stage, wherein:
the first stage processes the image to generate initial predictions of the respective locations; and
the second stage, using intermediate features generated from the image by the first stage, and the initial predictions, generates crops of shared convolutional features for regions of interest to define cropped features and further processes the cropped features to produce respective refinement location offsets to the initial predictions of the respective locations; and
wherein the second stage comprises a predict block to process the cropped features, the predict block performing, in order:
channel-wise convolutions with 3×3 kernel followed by BatchNorm and ReLU activation; and,
group-wise channel convolutions with 1×1 kernel followed by BatchNorm;
to output each of the respective refinement location offsets.

11. The method of claim 5 further comprising modifying the image at or about at least one of the respective locations of the plurality of landmarks.

12. The method of claim 11 wherein modifying the image comprises simulating a product applied to the image.

13. The method of claim 12 wherein the image is a video image and wherein the method presents the image as modified in real time to simulate a virtual reality.

14. The method of claim 10 further comprising modifying the image at or about at least one of the respective locations of the plurality of landmarks.

15. The method of claim 14 wherein modifying the image comprises simulating a product applied to the image.

16. The method of claim 15 wherein the image is a video image and wherein the method presents the image as modified in real time to simulate a virtual reality.

17. A computing device comprising at least one processor and a storage device coupled thereto, the storage device storing instructions that when executed by the at least one processor configure the computing device to process an image to determine respective locations of each of a plurality of landmarks by:
processing the image using a Convolutional Neural Network (CNN) having a first stage and a second stage, wherein:
the first stage processes the image to generate initial predictions of the respective locations; and
the second stage, using intermediate features generated from the image by the first stage, and the initial predictions, generates crops of shared convolutional features for regions of interest to define cropped features and further processes the cropped features to produce respective refinement location offsets to the initial predictions of the respective locations; and
wherein the second stage comprises a predict block to process the cropped features, the predict block performing, in order:
channel-wise convolutions with 3×3 kernel followed by BatchNorm and ReLU activation; and,
group-wise channel convolutions with 1×1 kernel followed by BatchNorm;
to output each of the respective refinement location offsets.

18. The computing device of claim 17 wherein the instructions when executed by the at least one processor configure the computing device to modify the image at or about at least one of the respective locations of the plurality of landmarks.

19. The computing device of claim 18 wherein to modify the image comprises simulating a product applied to the image.

20. The method of claim 5 wherein the second stage comprises a predict block to process the cropped features, the predict block performing, in order:
channel-wise convolutions with 3×3 kernel followed by BatchNorm and ReLU activation; and,
group-wise channel convolutions with 1×1 kernel followed by BatchNorm;
to output each of the respective refinement location offsets.

* * * * *